United States Patent Office 3,141,003
Patented July 14, 1964

3,141,003
AQUEOUS SOLUTION OF STEREOREGULAR POLYVINYL ALCOHOL; METHOD OF MAKING SAME; FOAMS, FIBERS, AND FILMS OBTAINED THEREFROM
Clifford A. Neros, Willoughby, and Nelson V. Seeger, Painesville, Ohio, assignors to Diamond Alkali Company, Cleveland, Ohio, a corporation of Delaware
No Drawing. Filed May 26, 1960, Ser. No. 31,798
7 Claims. (Cl. 260—2.5)

This invention relates to a composition of matter comprising polyvinyl alcohol and a solvent therefor. More particularly, it relates to an aqueous solution of polyvinyl alcohol, which material is insoluble in water at a temperature of 100° C., and films, fibers, etc. formed therefrom.

It is known that conventional polyvinyl alcohol, which is soluble in water, can be formed into films, fibers, etc. from an aqueous solution of the resin. Such films and fibers are characterized by their sensitivity to water, especially hot water. If immersed in water at ordinary temperatures, the film or fiber will shrink by more than 10% of its original size and if the temperature of the water is around 70°–90° C., the film or fiber will dissolve.

Polyvinyl alcohol (PVA), fibers and films have been made resistant to water by various methods including modification of the resin prior to forming into the desired shape and after-treatment of the fiber or film. It has been known to incorporate into the polyvinyl solution a compound such as a dicarboxylic acid which is capable of forming a cross-linked structure under the influence of heat. It has also been known to acetalize the polyvinyl alcohol, then form the fiber or film and follow up with a heat treatment of the material.

The fiber or film, after being formed from a polyvinyl alcohol solution, has been made resistant to water by various treatments such as stretching and heat-treating, stretching and reacting with a material such as an aldehyde, ketone or dibasic acid, exposure to formaldehyde vapors or elevated temperatures, and treatment of the surface with waxes, etc., which treatments are expensive and often introduce undesirable physical characteristics and impurities in the treated materials.

Conventional polyvinyl alcohol is obtained by saponification, hydrolysis or alcoholysis of polymerized vinyl esters, especially polymerized vinylacetate. The molecular weight of the polyvinyl alcohol is dependent upon that of the ester, i.e., a high molecular weight polyvinyl alcohol is obtainable from an ester having a correspondingly high molecular weight. The conventional PVA, having a reduced viscosity of 1.0, is completely soluble in water at a temperature of about 70° C. Accordingly, an aqueous solution of PVA may be employed to produce fibers, films, etc. therefrom.

The polyvinyl alcohol of this invention, hereafter referred to as "stereoregular polyvinyl alcohol" or "RPVA," is obtained by alcoholysis of polymerized vinyl halo esters, especially polyvinyl chloroacetates and polyvinyl fluoroacetates, as disclosed in U.S. patent application Ser. No. 689,768, filed October 14, 1957, now abandoned. The stereoregular polyvinyl alcohol, having a reduced viscosity of 1.1, is insoluble in water at a temperature of 100° C. This RPVA may be dissolved in water at a temperature of 115°–120° C. The insolubility of RPVA in water at 100° C. has been attributed to the syndiotacticity of the alcohol as contrasted to an atactic structure possessed by conventional polyvinyl alcohol.

As disclosed in application Serial No. 689,768, the monomer employed is preferably a polymerizable vinyl halo ester such as a vinyl chloroacetate or a vinyl fluoroacetate. Polymerization of the monomer can be carried out by any of the conventional polymerization methods such as bulk, emulsion, suspension or solution polymerization with bulk polymerization being preferred. In carrying out the polymerization the monomer containing a small amount of initiator, e.g., about 0.01 percent to about 1.0 percent by weight of the monomer of an initiator consisting of a peroxide catalyst such as lauroyl peroxide, acetyl peroxide, benzoyl peroxide or the like, is maintained at a temperature within the range from about room temperature up to about 80° C. The polymerization should be carried out in an inert atmosphere, i.e., a non-oxidizing atmosphere such as nitrogen, helium or the like. There results from such polymerization a polymer typically a polyvinyl chloroacetate or a polyvinyl fluoroacetate which is then hydrolyzed, preferably alcoholized to obtain a polyvinyl alcohol.

In carrying out the alcoholysis it is convenient to dissolve the polymer in a solvent which is inert in basic anhydrous solutions. Specific illustrative and preferred solvents are tetrahydrofuran and dioxane, although ethers or acetals which dissolve the polymer also may be used. Generally, in carrying out the alcoholysis, the polymer, dissolved in a solvent, is added to a refluxing anhydrous alkali metal alcoholate which may or may not contain a further solvent such as tetrahydrofuran, a specifically illustrative and preferred mixture being about 80 volumes of tetrahydrofuran and 20 volumes of methanol. To this refluxing mixture is added sufficient of an alkali metal alcoholate, i.e., the reaction product of an alkanol, especially a lower alcohol such as methanol, ethanol, propanol, or the like, and an alkali metal. The alkali metal alcoholate is dissolved in a larger quantity of an alkanol, generally and preferably methanol. The expression "alkali metal" is intended to refer to the several alkali metals, i.e., sodium, potassium, lithium, rubidium and cesium, sodium being preferred.

A specific illustrative alcohol mixture comprises about 10 percent by volume of sodium methylate and 90 percent by volume of methanol. As to the alkalinity required in the alcoholysis medium, it is desirable to have a 0.3 to 0.5 percent alkalinity as measured by titration. If a substantially larger percentage of alkalinity is present, the resultant polymer often tends to be discolored. On the other hand, if insufficient alkalinity exists, alcoholysis generally is not effected.

The amount of the sodium methylate or other alkali metal alcoholate added is dictated by the amount necessary to keep the alcoholysis medium basic. The alcoholysis is carried out until the desired amount of polymer is converted to polyvinyl alcohol.

The resultant polyvinyl alcohol is neutralized generally with a weak organic acid such as acetic acid which is preferred to a strong acid in that it avoids undesired side reactions. The neutralized polyvinyl alcohol is filtered, washed with an organic solvent such as methanol, or, if desired, cold water which demonstrates one of the differences between this product and prior polyvinyl alcohol in that cold water washing of polyvinyl alcohol of this invention does not result in the formation of a sticky, gummy mass as is the case with the conventional polyvinyl alcohol. The resultant polymer is then dried and is ready for use.

It is an object of this invention to provide a suitable solvent for stereoregular polyvinyl alcohol which is substantially insoluble in water at 100° C. It is a further object of this invention to provide a composition of matter comprising RPVA which is insoluble in water at 100° C. and a solvent therefor from which films, fibers, etc. may be formed.

Another object of this invention is to provide a method of dissolving in water a stereoregular polyvinyl alcohol which is substantially insoluble in boiling water.

TABLE I

| Reagent | After 5 hrs. at room temp. | After 24 hrs. at room temp. | Additional 5 hrs. at 50-55 °C. | Additional 2 hrs. at 90-95 °C. |
|---|---|---|---|---|
| Water | NNE | NNE | NNE | NNE. |
| Ethylene diamine | Dissolved | Dissolved | Dissolved | Dissolved. |
| Acetic acid, glacial | NNE | NNE | NNE | v. sl. swollen. |
| Acetic anhydride | NNE | NNE | NNE | NNE. |
| Ammonium thiocyanate (sat. sol.) | Considerable swelling | Considerable swelling | Considerable swelling | Considerable swelling. |
| Formic acid (98-100%) | do | do | do | Degradation. |
| Lithium bromide (60% sol.) | sl. swollen | do | do | Greatly swollen. |
| Zinc chloride (60% sol.) | NNE | do | do | Dissolved-pink. |
| Ethylene chloride | NNE a 50° C | NNE a 50° C | NNE a 50° C | NNE. |
| Propylene carbonate | NNE | NNE | NNE | NNE. |
| 2-nitropropane | NNE | NNE | NNE | NNE. |
| Butyrolactone | NNE | NNE | NNE | NNE. |
| Tetrahydrofurfuryl alcohol | NNE | NNE | NNE | NNE. |
| Chloromaleic anhydride | NNE | NNE | NNE | NNE. |
| Triethylene diamine (sat. sol.) | Apparently dissolved | Apparently dissolved | Apparently dissolved | Apparently dissolved. |
| Morpholine | NNE | NNE | NNE | v. sl. swollen. |
| Piperidine | NNE | NNE | NNE | Swollen. |
| Pyridine | NNE | NNE | NNE | NNE-darkened. |
| Piperazine (sat. sol.) | Appears to be dissolved | Appears to be dissolved | Appears to be dissolved | Appears to be dissolved. |
| Triethanolamine | NNE | NNE | NNE | NNE. |
| Diethanolamine | NNE | NNE | NNE | NNE. |
| Nitroethane | NNE | NNE | NNE | NNE. |
| Acetonitrile | NNE | NNE | NNE | NNE. |
| N-acetylmorpholine | NNE | NNE | NNE | NNE. |
| 1,6-hexanediamine, 72% | Appears to be dissolved | Appears to be dissolved | Appears to be dissolved | Appears to be dissolved. |
| Resorcinol (sat. sol.) | Swollen | Considerable swelling | Considerable swelling | Greatly swollen. |
| Caprolactam (sat. sol.) | NNE | v. sl. swollen | do | Do. |
| Dimethyl sulfone (sat. sol.) | v. sl. swollen | sl. swollen | Swollen | Do. |
| Dimethyl sulfoxide | sl. swollen | Considerable swelling | Considerable swelling | Do. |
| Tricresyl phosphate | NNE | NNE | NNE | NNE. |
| Chloroform | NNE | NNE | NNE | NNE. |
| Diacetin | NNE | NNE | NNE | NNE. |
| Formamide | NNE | sl. swollen | sl. swollen | sl. swollen. |
| Triisooctyl phosphite | NNE | NNE | NNE | NNE. |
| Bis(2-ethylhexyl)hydrogen phosphate | NNE | NNE | NNE | NNE. |
| β-hydroxypropionitrile | NNE | NNE | NNE | Swollen. |
| 2(2-aminoethylamine) ethanol | NNE | v. sl. swollen | Appears to be dissolved | Appears to be dissolved. |
| 2-pyrrolidinone | NNE | NNE | v. sl. swollen | Greatly swollen. |
| N-methylacetamide | NNE | NNE | NNE | sl. swollen. |
| Propargyl alcohol | NNE | v. sl. swollen | v. sl. swollen | v. sl. swollen. |
| Tetramethylene sulfone | NNE | NNE | NNE | NNE. |
| β-alanine (sat. sol.) | NNE | v. sl. swollen | sl. swollen | Swollen. |
| Glycine (sat. sol.) | sl. swollen | Swollen | Swollen | Do. |
| Guanylurea phosphate (sat. sol.) | do | do | Greatly swollen | Greatly swollen. |
| Methylamine (30% sol.) | Appears to be dissolved | Appears to be dissolved | Appears to be dissolved | Appears to be dissolved. |
| Menthane diamine | NNE | NNE | NNE | NNE. |
| β-hydroxyethyl trimethyl ammonium-bicarbonate, 45%. | v. sl. swollen | v. sl. swollen | sl. swollen | Swollen. |
| Cyanamide (sat. sol.) | Considerable swelling | Considerable swelling | Greatly swollen | Dissolved. |
| β-propiolactone | NNE | NNE | NNE | sl. swollen. |
| Urea (sat. sol.) | Greatly swollen | Greatly swollen | Greatly swollen | Dissolved (may contain gel). |
| Onyx BTC, 50%* | Considerable swelling | Considerable swelling | Considerable swelling | Considerable swelling. |
| HCl (conc.) | Dissolved | Dissolved | Dissolved | |
| NH₄OH (conc.) | Swollen | Swollen | do | |
| SO₂/dimethyl formamide, saturated | NNE | NNE | NNE | NNE. |
| SO₂/tetrahydrofuran, saturated | NNE | NNE | NNE | (¹). |
| LiBr/dimethyl formamide, saturated | NNE | NNE | Greatly swollen | Greatly swollen. |
| LiBr/dimethyl sulfoxide, saturated | NNE | sl. swollen | Extremely swollen | Extremely swollen. |
| LiBr/tetrahydrofuran, saturated | NNE | NNE | NNE | (¹). |
| ZnCl₂/dimethyl formamide, saturated | NNE | NNE | v. v. sl. swollen | NNE. |
| ZnCl₂/dimethyl sulfoxide, saturated | v. v. sl. swollen | sl. swollen | Extremely swollen | Partially dissolved. |
| ZnCl₂/tetrahydrofuran, saturated | NNE | NNE | NNE | (¹). |
| Dimethyl formamide/H₂O, 4:1 ratio | v. v. sl. swollen | sl. swollen | Swollen | Extremely swollen. |
| Dimethyl sulfoxide/H₂O, 4:1 ratio | sl. swollen | Swollen | do | Do. |
| H₂O/ethylene glycol, 4:1 ratio | do | do | do | Greatly swollen. |
| Diacetone alcohol | NNE | NNE | NNE | NNE. |
| Tetrahydropyran-2-methanol | NNE | NNE | NNE | NNE. |
| Ethyl carbamate | (M.P., 48-50° C.) | | NNE | NNE. |
| Ethylene glycol | NNE | v. v. sl. swollen | sl. swollen | Swollen. |
| Urea/tetrahydrofuran, saturated | NNE | NNE | NNE | (¹). |
| Urea/dimethyl formamide, saturated | NNE | NNE | sl. swollen | sl. swollen. |
| Urea/ethylene glycol, saturated | NNE | v. v. sl. swollen | sl. swollen | Swollen. |
| Urea/dimethyl sulfoxide, saturated | sl. swollen | Extremely swollen | Extremely swollen | Extremely swollen. |
| Urea/2-pyrrolidone | NNE | NNE | NNE | Swollen. |
| Cyanamide/tetrahydrofuran, saturated | NNE | NNE | NNE | (¹). |
| Cyanamide/dimethyl formamide, saturated | NNE | NNE | v. v. sl. swollen | v. v. sl. swollen. |
| Cyanamide/ethylene glycol, saturated | NNE | NNE | NNE | Swollen. |
| Cyanamide/dimethyl sulfoxide, saturated | Swollen | Considerable swelling | Considerable swelling | Considerable swelling. |
| Triethylene diamine/tetrahydrofuran | NNE | NNE | NNE | (¹). |
| Triethylene diamine/dimethyl formamide | NNE | NNE | sl. swollen | sl. swollen. |
| Triethylene diamine/ethylene glycol | NNE | NNE | v. sl. swollen | Swollen. |
| Triethylene diamine/dimethyl sulfoxide | sl. swollen | Considerable swelling | Considerable swelling | Considerable swelling. |
| Triethylene diamine/2-pyrrolidone | NNE | NNE | NNE | Extremely swollen. |
| Caprolactam/tetrahydrofuran | NNE | NNE | NNE | (¹). |
| Caprolactam/dimethyl formamide | NNE | NNE | sl. swollen | sl. swollen. |
| Caprolactam/ethylene glycol | NNE | NNE | NNE | sl. swollen. |
| Piperazine(hydrate)/tetrahydrofuran | NNE | NNE | sl. gel. in | (¹). |
| Piperazine(hydrate)/dimethyl formamide | NNE | NNE | NNE | NNE. |
| Piperazine(hydrate)/ethylene glycol | NNE | NNE | NNE | Swollen. |
| Piperazine(hydrate)/dimethyl sulfoxide | sl. swollen | Considerable swelling | Considerable swelling | Dissolved. |
| Guanylurea phosphate/tetrahydrofuran | NNE | NNE | NNE | (¹). |
| Guanylurea phosphate/dimethyl formamide | NNE | NNE | sl. swollen | sl. swollen. |
| Guanylurea phosphate/ethylene glycol | NNE | NNE | do | Swollen. |
| Guanylurea phosphate/dimethyl sulfoxide | Swollen | Considerable swelling | Considerable swelling | Considerable swelling. |
| Dichloroacetic acid/glycerine | NNE | NNE | NNE | v. sl. swollen. |
| Dichloroacetic acid/tetrahydrofuran | NNE | NNE | NNE | (¹). |
| Dichloroacetic acid/dimethyl formamide | NNE | NNE | v. sl. swollen | sl. swollen. |
| Dichloroacetic acid/dimethyl sulfoxide | Considerable swelling | Extremely swollen | Extremely swollen | Extremely swollen. |
| Formic acid/ethylene glycol | NNE | NNE | NNE | Considerable swelling. |
| Triethylamine | NNE | NNE | NNE | NNE. |

*Alkyl (C₉-C₁₈) dimethyl benzyl ammonium chloride, 25% sol.

¹=solvent boiled off. NNE=no noticeable effect. v.=very. sl.=slightly. conc.=concentrated. sat.=saturated. sol.=solution.

Stereoregular polyvinyl alcohol is not only insoluble in boiling water but is also insoluble in most solvents or combinations thereof. In order to determine the effect of various solvents on RPVA, a film of the material was cast from a water dispersion of the resin. The dispersion was spread on a glass plate and water evaporated therefrom to form a film. Small sections of this film were immersed in the solvents tested and the effect of numerous solvents is shown in Table I.

From Table I it will be noted that ethylene diamine, saturated, aqueous solution of triethylene diamine, saturated solution of piperazine, 72% solution of 1,6-hexanediamine, 30% solution of methylamine, and concentrated hydrochloric acid apparently dissolve the stereoregular polyvinyl alcohol. The aqueous solutions of triethylene diamine, piperazine, hexanediamine and methylamine all are quite alkaline, having a pH in the neighborhood of about 12. Films of RPVA which were reprecipitated from these aqueous solutions were found to be water-soluble and this led to the belief that such materials cause a possible degradation of the alcohol, accounting for its solubility. Concentrated hydrochloric acid is very difficult to handle and therefore is undesirable as a solvent. As with conventional water-soluble polyvinyl alcohol, water is the ideal solvent for RPVA since it is low in cost, neutral, nontoxic and presents no recovery problem. Further, RPVA from an aqueous solution may be dry-spun, thus eliminating the need for a coagulating bath.

Reference has been made to the reduced viscosity ($N_{red}$) of polyvinyl alcohol. This value is an indication of the molecular weight of the polymer and is equal to the specific viscosity ($N_{sp}$) divided by the concentration of polymer in the solution. The flow time of the polymer solution $t_c$ and the flow time of the solvent $t_0$ are usually measured by the capillary method. From these values the specific viscosity is computed according to the formula $$N_{sp} = \frac{t_c - t_0}{t_0}$$

The reduced viscosity has a more or less logarithmic relationship to the molecular weight of the polymer and, in general, the range is

| $N_{red}$: | Approximate molecular weight |
|---|---|
| 0.5 | 40,000–60,000 |
| 0.1–1.5 | 100,000–200,000 |
| 3.0 | 500,000–1,000,000 |

Since conventional polyvinyl alcohol is soluble in water, this is used as the solvent in determining the reduced viscosity. Reduced viscosity of RPVA cannot be determined in this manner, however, since it is insoluble in water. Accordingly, the reduced viscosity of the precursor, i.e., polyvinyl chloroacetates or polyvinyl fluoroacetates, is determined and, as is common practice in the polymer field, this value is assumed to be proportional to the reduced viscosity of the alcohol.

Stereoregular polyvinyl alcohol may be dissolved in water at a temperature of about 115°–120° C. In order to obtain such temperatures, the equipment must be pressurized; however, the pressure need be no greater than the vapor pressure of water at that temperature, i.e., in the neighborhood of 10–15 p.s.i. The RPVA is more readily dissolved by employing equipment provided with a high-speed agitator which produces a vortex in the water. Cold water, i.e., 75° F. or less, is added to the vessel and the mixer is started. RPVA powder is sifted directly into the vortex so that it is rapidly wet and dispersed. The slurry or dispersion is stirred for a short time and then heated under pressure to a temperature of about 120° C. The mixture is maintained at this temperature until solution is complete. The solution may then be cooled to about 85°–110° C. and the RPVA will remain in solution for a short time.

An aqueous solution of stereoregular polyvinyl alcohol, prepared as above, may be used to form fibers and films. A dry-spinning process may be employed for making fibers, thus eliminating the need for a coagulating bath. The fiber is spun or extruded into a high humidity atmosphere which will prevent water evaporating from the fiber too rapidly so that a solid fiber will be formed. If, on the other hand, a film or porous fiber is desired, the water may be evaporated very rapidly from the fiber as it is spun or extruded.

Typically, an aqueous solution of RPVA at a temperature of about 90°–100° C. is extruded by means of a gear pump through a spinnerette into an air chamber maintained at a high humidity. The fiber or yarn is led through a positively-driven godet and then through air to a positively-driven wind-up bobbin. By adjusting the speeds of the various drives, the fiber can be stretched or drawn in controllable amounts before the godet or between the godet and wind-up, or both. Fibers formed in this manner have a dry tenacity of at least 7.5 grams per denier and are important in industrial uses such as cords for tires, fire hoses, industrial cords and belting, and as reinforcing fibers for many applications.

Aqueous solutions of stereoregular polyvinyl alcohol containing about 2% to 20% RPVA may be employed to produce films. The solution may be cast on a suitable surface, e.g., glass or a hydrophobic surface such as polystyrene, polyethylene or polypropylene. It may be necessary to add a small amount, e.g., 0.1% of a non-ionic surface active agent to aid in wetting the hydrophobic surface. Upon evaporation of the water, a continuous transparent, colorless film remains which may be stripped from the casting surface. If desired, a laminate can be prepared by casting the solution on the surface of a material such as polystyrene, polyethylene or polypropylene and permitting the RPVA film to remain thereon, thus forming a transparent, flexible laminate of the base material and moisture and grease-resistant RPVA which is easily printable.

A foamed or porous film of RPVA may be produced by rapidly evaporating the water from the cast film. This can be accomplished by placing the material, upon which the material is cast, immediately into a high-temperature atmosphere having very low humidity. The rapidly evaporating water will cause voids or cavities within the film which will result in a foamed or porous material.

In order that those skilled in the art may more completely understand the present invention and the preferred methods by which the same may be carried into effect, the following specific examples are offered.

PREPARATION OF RPVA

Part A

*Preparation of monomer.*—200 g. of monochloroacetic acid, 0.4 g. hydroquinone and 20 g. of yellow mercuric oxide are placed in a flask and heated until the monochloroacetic acid is molten (40° to 60° C.). Acetylene is then bubbled into the liquid reaction mass over a period of about 4 to 5 hours while maintaining the temperature between 40° to 45° C. The resulting vinyl chloroacetate monomer is filtered to remove catalyst and is distilled at 37° to 42° C. at 11 mm. Hg pressure. This crude distillate is fractionated and the portion boiling at 44° to 48° C. at 20 mm. Hg, weighing 128.7 g. is separated.

Part B

*Preparation of polymer.*—30 g. of the thus-obtained vinyl monochloroacetate monomer and 0.03 g. lauroyl peroxide are placed in a glass container which is cooled and purged with nitrogen. Polymerization is then effected by sealing this tube and maintaining the temperature at 45° C. for 120 hours. The resulting polymer is dissolved in acetone, precipitated therefrom with petroleum ether, and dried in a vacuum oven.

Part C

*Preparation of polyvinyl alcohol.*—The resultant polyvinyl monochloroacetate is dissolved in 180 ml. of tetrahydrofuran. Separately, 3.8 g. of sodium is reacted with 100 ml. of chemically pure methanol to form sodium methylate; the resultant tetrahydrofuran-polymer solution and sodium methylate solution are added slowly, the reaction medium being maintained slightly alkaline. The resultant polyvinyl alcohol is neutralized with acetic acid and separated by filtration to obtain a polymer weighing, after drying in a vacuum oven, 7.6 g. X-ray diffraction patterns of this polyvinyl alcohol indicate a high degree of crystallinity as compared with a commercially available polyvinyl alcohol.

EXAMPLE 1

Water is added to a laboratory blender having a high-speed agitator. An amount of RPVA, equal to 5% of the total mixture, is gradually added to the water. The mixture is agitated for 30 minutes and is then transferred to a pressurized vessel where it is heated under a pressure of 15 p.s.i. (250° F.) for a period of 30 minutes. The RPVA is completely dissolved. The solution may be cooled to a temperature of about 85°–110° C. if it is to be used within a short time.

EXAMPLE 2

The RPVA solution prepared in Example 1 is cast on a glass plate and allowed to dry for 48 hours at a temperature of 73° F. under 50% relative humidity. The film thus formed is stripped from the plate and conditioned for three days under uniform conditions of 73° F. and 50% RH. This film, when tested in a tensiometer at a cross-head rate of 1 inch per minute, has a tensile strength of 10,000 to 12,000 p.s.i. The tensile modulus of the film is 316,700 to 500,000 p.s.i.

EXAMPLE 3

Cold water (75° F.) is added to a vessel containing a high-speed agitator capable of forming a vortex in the water. The agitator is started and an amount of RPVA, equal to 10% of the total mixture, is slowly added directly into the vortex. The mixture is agitated for 30 minutes and then is heated to a temperature of 120° C. under a pressure of 15 p.s.i. The mixture is maintained at this temperature for about one hour, during which time all of the RPVA is dissolved. If the RPVA solution is to be used immediately, the pressure is removed and the solution may be cooled to a temperature of about 90°–100° C.

EXAMPLE 4

An aqueous solution of water-insoluble RPVA having a reduced viscosity of 1.5, prepared as in Example 3, is employed to form water-insoluble fibers. Using a prototype laboratory spinning apparatus, the solution is spun through a spinnerette containing eight orifices, each of which is 0.003 inch in diameter, into a chamber containing air having a high relative humidity. The strand is wet-stretched 1.5 times and wound on a supply spool. The supply spool is placed on a hot-stretch machine where the strand passes through a bath of hot mineral oil maintained at a temperature of about 135°–140° C. The exposure time of the strand in the bath is about 20 seconds. The strand is stretched to a length 8 times its original length on this machine. The fiber is insoluble in boiling water and has a dry tenacity of 7.5 grams per denier.

It is to be understood that although the invention has been described with specific reference to particular embodiments thereof, it is not to be so limited, since changes and alterations therein may be made which are within the full intended scope of this invention as defined by the appended claims.

What is claimed is:

1. A composition-of-matter consisting essentially of a solution of water containing about 2 percent to about 20 percent, by weight, of stereoregular polyvinyl alcohol which is insoluble in water at 100° C.; said solution being maintained at a pressure of about 15 p.s.i.; said stereoregular polyvinyl alcohol having been prepared by the steps of (1) combining about 0.01 percent to about 1 percent by weight of a peroxide catalyst and a monomer selected from the group consisting of vinyl chloroacetates and vinyl fluoroacetates, (2) polymerizing the monomer at a temperature in the range from about room temperature to about 80° C., (3) hydrolyzing the resultant monomer in the presence of a solvent which is inert in basic anhydrous solutions, the solvent being selected from the group consisting of tetrahydrofuran and dioxane, carrying out the hydrolysis in a refluxing anhydrous alkali metal alcoholate and (4) neutralizing the resultant polyvinyl alcohol.

2. The composition of matter of claim 1 wherein the polyvinyl alcohol comprises about 5% to 10% of the total composition.

3. The method of forming an aqueous solution of stereoregular polyvinyl alcohol which is insoluble in water at 100° C. comprising the steps of slowly adding about 2 percent to about 20 percent of stereoregular polyvinyl alcohol to vigorously agitated water at room temperature, agitating the mixture and heating the mixture to a temperature of about 115°–120° C. under a pressure of about 15 p.s.i., said stereoregular polyvinyl alcohol having been prepared by the steps of (1) combining about 0.01 percent to about 1 percent by weight of a peroxide catalyst and a monomer selected from the group consisting of vinyl chloroacetates and vinyl fluoroacetates, (2) polymerizing the monomer at a temperature in the range from about room temperature to about 80° C., (3) hydrolyzing the resultant polymer in the presence of a solvent which is inert in basic anhydrous solutions, the solvent being selected from the group consisting of tetrahydrofuran and dioxane, carrying out the hydrolysis in a refluxing anhydrous alkali metal alcoholate and, (4) neutralizing the resultant polyvinyl alcohol.

4. The method of forming an aqueous solution of stereoregular polyvinyl alcohol which is insoluble in water at 100° C. comprising the steps of slowly adding to vigorously agitated water at a temperature in the neighborhood of 75° F. about 5% to 10% of stereoregular polyvinyl alcohol, agitating the mixture for at least 30 minutes and heating the mixture to a temperature of about 115°–120° C. under a pressure of about 15 p.s.i. for a period of at least 30 minutes, said stereoregular polyvinyl alcohol having been prepared by the steps of (1) combining about 0.01 percent to about 1 percent by weight of a peroxide catalyst and a monomer selected from the group consisting of vinyl chloroacetates and vinyl fluoroacetates, (2) polymerizing the monomer at a temperature in the range from about room temperature to about 80° C., (3) hydrolyzing the resultant polymer in the presence of a solvent which is inert in basic anhydrous solutions, the solvent being selected from the group consisting of tetrahydrofuran and dioxane, carrying out the hydrolysis in a refluxing anhydrous alkali metal alcoholate and, (4) neutralizing the resultant polyvinyl alcohol.

5. Fibers formed from the composition of matter of claim 1.

6. Films formed from the composition of matter of claim 1.

7. The method of producing foamed polyvinyl alcohol which comprises the steps of forming an aqueous solution of stereoregular polyvinyl alcohol by slowing adding to vigorously agitated water, at a temperature in the neighborhood of 75° F., about 2% to 20% by weight of stereoregular polyvinyl alcohol; agitating the mixture and heating the mixture to a temperature of about 115° to 120° C. under a pressure of about 15 p.s.i. to dissolve the alcohol; forming the solution into the desired shape and rapidly evaporating the water from the shaped polyvinyl alcohol, said stereoregular polyvinyl alcohol having been prepared by the steps of (1) combining about 0.01 percent to about 1 percent by weight of a peroxide catalyst and a monomer selected from the group consisting of vinyl chloroacetates and vinyl fluoroacetates, (2) polymerizing the monomer at a temperature in the range from about room temperature to about 80° C., (3) hydrolyzing the resultant polymer in the presence of a solvent which is inert in basic anhydrous solutions, the solvent being selected from the group consisting of tetrahydrofuran and dioxane, carrying out the hydrolysis in a refluxing anhydrous alkali metal alcoholate and, (4) neutralizing the resultant polyvinyl alcohol.

References Cited in the file of this patent

UNITED STATES PATENTS

| | | |
|---|---|---|
| 2,138,751 | Vohrer | Nov. 29, 1938 |
| 2,146,295 | Hermann et al. | Feb. 7, 1939 |
| 2,567,950 | Stauffer | Sept. 18, 1951 |
| 2,576,318 | Toulmin | Nov. 27, 1951 |
| 2,610,360 | Cline et al. | Sept. 16, 1952 |
| 2,876,085 | Horie | Mar. 3, 1959 |
| 2,930,770 | Wade | Mar. 29, 1960 |
| 3,063,787 | Rynkiewicy et al. | Nov. 13, 1962 |

OTHER REFERENCES

Dupont: "Elvanol" Polyvinyl Alcohol, Du Pont de Nemours & Company, copyright 1953, page 37.

Frith and Tuckett: Linear Polymers, pages 25, 26 and 157, published 1951, Longmans, Green and Company, New York, New York.